(12) United States Patent
Kim et al.

(10) Patent No.: US 12,226,067 B2
(45) Date of Patent: Feb. 18, 2025

(54) ROBOT CLEANER AND CONTROL METHOD THEREOF

(71) Applicant: SAMSUNG ELECTRONICS CO., LTD., Suwon-Si (KR)

(72) Inventors: Ahhyun Kim, Suwon-si (KR); Nooree Na, Suwon-si (KR); Miyoung Lee, Suwon-si (KR); Hyeokjin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 17/828,697

(22) Filed: May 31, 2022

(65) Prior Publication Data

US 2022/0291693 A1    Sep. 15, 2022

Related U.S. Application Data

(63) Continuation of application No. PCT/KR2022/002940, filed on Mar. 2, 2022.

(30) Foreign Application Priority Data

Mar. 5, 2021  (KR) .................. 10-2021-0029247
Jul. 15, 2021  (KR) .................. 10-2021-0093064

(51) Int. Cl.
  *A47L 9/00*     (2006.01)
  *A47L 11/40*    (2006.01)
  *G01C 21/00*    (2006.01)

(52) U.S. Cl.
  CPC ........... *A47L 9/009* (2013.01); *A47L 11/4011* (2013.01); *G01C 21/383* (2020.08)

(58) Field of Classification Search
  None
  See application file for complete search history.

(56) References Cited

U.S. PATENT DOCUMENTS 9,798,957 B2   10/2017  Noh et al.
10,660,496 B2   5/2020  Han et al.
(Continued)

FOREIGN PATENT DOCUMENTS

CN   107169595 B   2/2020
CN   111096714 A   5/2020
(Continued)

OTHER PUBLICATIONS

Written Opinion of the ISA dated Jun. 9, 2022 issued in PCT Application No. PCT/KR2022/002940.
(Continued)

*Primary Examiner* — Amelia Vorce
(74) *Attorney, Agent, or Firm* — STAAS & HALSEY LLP

(57) ABSTRACT

A robot cleaner includes a driving device, a sensor, a memory, and a processor. The processor controls the driving device to drive the robot cleaner at a space and generates generate a map of a space based on sensor data obtained while the robot cleaner driving in the space. The map is stored in the memory. The processor divides the space on the generated map into a plurality of rooms and recognizes an object and a position of the recognized object in the space on the generated map based on the information obtained through the sensor. The processor stores information about the recognized object and the position of the recognized object on the map, and generates a name of each of the plurality of rooms based on information about the recognized object positioned in each of the plurality of rooms.

12 Claims, 19 Drawing Sheets

(56) References Cited

U.S. PATENT DOCUMENTS

| | | | |
|---|---|---|---|
| 10,695,906 B2 | 6/2020 | Kim et al. | |
| 10,701,661 B1* | 6/2020 | Coelho | H04W 4/023 |
| 10,747,232 B2 | 8/2020 | Xia et al. | |
| 11,334,084 B2 | 5/2022 | Lee et al. | |
| 2016/0167234 A1* | 6/2016 | Angle | H04L 67/125 |
| | | | 701/2 |
| 2017/0079498 A1* | 3/2017 | Kim | G05D 1/0022 |
| 2017/0273527 A1 | 9/2017 | Han et al. | |
| 2018/0249874 A1* | 9/2018 | Kuhara | A47L 9/2852 |
| 2018/0252534 A1* | 9/2018 | Kuhara | A47L 9/2857 |
| 2018/0344116 A1* | 12/2018 | Schriesheim | A47L 9/2857 |
| 2019/0001584 A1 | 1/2019 | Costyson et al. | |
| 2019/0015985 A1* | 1/2019 | Kim | B25J 9/1697 |
| 2019/0340433 A1* | 11/2019 | Frank | G01C 21/3841 |
| 2020/0027336 A1 | 1/2020 | Cho et al. | |
| 2020/0070345 A1* | 3/2020 | Wiegel | G01C 21/206 |
| 2020/0218274 A1 | 7/2020 | Lee et al. | |
| 2020/0225673 A1* | 7/2020 | Ebrahimi Afrouzi | |
| | | | G05D 1/0044 |
| 2020/0319640 A1 | 10/2020 | Vogel et al. | |
| 2020/0412568 A1* | 12/2020 | Shinomoto | H04L 12/2809 |
| 2021/0096579 A1* | 4/2021 | Artes | G01C 21/383 |
| 2021/0373558 A1* | 12/2021 | Schneider | G01C 21/206 |
| 2022/0026920 A1* | 1/2022 | Ebrahimi Afrouzi | |
| | | | G05D 1/0219 |
| 2022/0074762 A1 | 3/2022 | Artes et al. | |
| 2022/0128997 A1* | 4/2022 | Huang | G01C 21/206 |
| 2023/0123290 A1* | 4/2023 | Ikeda | G06F 3/16 |
| | | | 704/260 |

FOREIGN PATENT DOCUMENTS

| | | | |
|---|---|---|---|
| JP | 2018147034 A | * 9/2018 | A47L 11/24 |
| JP | 6609463 B2 | 11/2019 | |
| JP | 2019217205 A | * 12/2019 | A47L 9/28 |
| JP | 2020-518906 A | 6/2020 | |
| KR | 10-0963783 B1 | 6/2010 | |
| KR | 10-2016-0036008 | 4/2016 | |
| KR | 10-1629649 A1 | 6/2016 | |
| KR | 10-2018-0058303 A | 6/2018 | |
| KR | 10-2018-0098891 A | 9/2018 | |
| KR | 10-2019-0003157 | 1/2019 | |
| KR | 10-2021834 | 9/2019 | |
| KR | 10-2020-0009640 A | 1/2020 | |
| KR | 10-2020-0085142 A | 7/2020 | |
| WO | WO 2020/041817 A1 | 3/2020 | |

OTHER PUBLICATIONS

International Search Report dated Jun. 9, 2022 issue in PCT Application No. PCT/KR20022/002940.

* cited by examiner

200

ROBOT CLEANER AND CONTROL METHOD THEREOF

CROSS-REFERENCE TO RELATED APPLICATION(S)

This application is a bypass continuation of International Application No. PCT/KR2022/002940, filed on Mar. 2, 2022, which is based on and claims priority to Korean Patent Application No. 10-2021-0029247, filed on Mar. 5, 2021, and Korean Patent Application No. 10-2021-0093064, filed on Jul. 15, 2021, in the Korean Intellectual Property Office, the disclosures of which are incorporated by reference herein in their entireties.

BACKGROUND

1. Field

The disclosure relates to a robot cleaner and a method for controlling the robot cleaner. More particularly, the disclosure relates to a robot cleaner that generates a map on a space, divides a cleaning area on a map into units of room for controlling, and a method for controlling thereof.

2. Description of Related Art

In general, a robot is developed for industry use and is widely used in various industrial sites. Recently, a field using a robot is further enlarged, and thus a robot is widely used in a medical field, an aerospace field, as well as a general household.

A representative of the robot used at a household is a robot cleaner. The robot cleaner performs a function of sucking and cleaning foreign substances such as dust while driving an indoor space at home.

As described above, in a situation where users who use the robot cleaner are increasing, a way for controlling the robot cleaner more efficiently is requested.

SUMMARY

The objective of the disclosure is to provide a robot cleaner and a control method thereof, capable of controlling a cleaning area on a map generated by a robot cleaner by dividing the area in units of room.

According to an embodiment, a robot cleaner includes a driving device, a sensor, a memory, and a processor configured to control the driving device to drive the robot cleaner, generate a map of a space where the robot cleaner is located based on information obtained through the sensor while driving the robot cleaner in the space, and store the generated map in the memory, divide the space on the generated map into a plurality of rooms, recognize an object and a position of the recognized object in the space on the generated map based on the information obtained through the sensor, store information about a recognized object and the position of the recognized object on the map, and generate a name of each of the plurality of rooms based on information about the recognized object positioned in each of the plurality of rooms.

The processor may further generate the room name based on at least one of a type of the recognized object located at each of the plurality of rooms.

The processor may, based on a division command to divide one room of the plurality of rooms being input on the map, divide the one room on the map to correspond to the input division command, and generate a room name for each of the divided rooms generated through the division, and based on a merge command to merge two or more rooms of the plurality of rooms to one merged room being input on the map, merge the two or more rooms of the plurality of rooms on the map to correspond to the input merge command, and generate a room name for the one merged room generated through the merging.

The processor may generate the name of each of the divided rooms divided based on information about the recognized object located at each room generated through the division.

The processor may, based on an area of each room generated through division, designate a name of a room before division to a room having a widest area, and generate a room name based on information about an object located at a room for remaining rooms.

The processor may generate a name of the one merged room based on information about an object located at a room generated through the merging.

The processor may, based on an area of each of a plurality of rooms before merging, generate a name of a room having a widest area as a name of the one merged room.

The processor may, based on an operation prohibition time setting command being input for at least one of the plurality of rooms on the map, stop a cleaning operation of the robot cleaner at a set time zone at a cleaning area corresponding to the room to which the operation prohibition time setting command is input.

The processor may, based on a command to clean around furniture being input, control the driving device to perform a cleaning operation for a preset area around a position of furniture among objects stored on the map.

The processor may, based on identification that a malfunction occurs to the robot cleaner by a preset number or more in an area on the map, set a cleaning area corresponding to the identified area as a no-entry zone.

The processor may provide a notification to propose map making based on no map stored in the memory, generate a map by moving a space based on a first user input being input, and make a map along with performing a cleaning operation based on a second user command being input.

According to an embodiment, a user terminal device includes a display, a communication interface to receive map information from a robot cleaner through the communication interface; and, and a processor configured to, based on the received map information, control the display to display a map user interface (UI) in which a cleaning area on a map is divided into a plurality of rooms, the map UI may include a room name corresponding to each of plurality of rooms, and the robot cleaner may generate a room name for each of the plurality of rooms based on information of an object located at the cleaning area.

The processor may display an editing user interface (UI) for receiving a division command to divide one room of the plurality of rooms or a merge command to merge the plurality of rooms into one room on the map UI, control the communication interface to transmit the division command or the merge command input through the editing UI to the robot cleaner, and based on the received updated map information from the robot cleaner, display a UI in which the room name is updated.

According to an embodiment, a method of controlling a robot cleaner includes generating a map of a space where the robot cleaner is located based on information obtained through a sensor while driving the space, storing the generated map, dividing the space on the generated map into a plurality of rooms, recognizing an object and a position of the recognized object in the space based on the obtained information through the sensor, storing information about the recognized object and the position of the recognized object on the map, and generating a name for each of the plurality of rooms based on information about the recognized object positioned in each of the plurality of rooms.

The generating of the room name may include generating a room name based on at least one of a type of the recognized object located at each of the plurality of rooms.

The generating of the room name may include, based on a division command to divide one room of the plurality of rooms being input on the map, dividing the one room on the map to correspond to the input division command, and generate a room name for each of the divided rooms generated through the dividing, and based on a merge command to merge two or more rooms of the plurality of rooms to one merged room being input on the map, merging the two or more rooms of the plurality of rooms on the map to correspond to the input merge command, and generating a room name for the one merged room generated through the merging.

The generating of the room name may include generating the name of each of the divided rooms based on information about the recognized object located at each room generated through the dividing.

The generating of the room name may include, based on a space of each room generated through division, designating a name of a room before division to a room having a widest space, and generating a room name based on information about an object located at a room for remaining rooms.

The generating of the room name may include generating a name of the one merged room based on information about an object located at a room generated through the merging.

The generating of the room name may include, based on a space of each of a plurality of rooms before merging, generating a name of a room having a widest space as a name of the one merged room.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Examples described hereinafter are for easy understanding of the disclosure, and it should be understood that various changes may be made to examples described herein and the disclosure may be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the disclosure and the claims are general terms identified in consideration of the functions of the various example embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps.

In this disclosure, the expressions "have," "may have," "include," or "may include" or the like represent presence of a corresponding feature (for example: components such as numbers, functions, operations, or parts) and does not exclude the presence of additional feature.

The terms first, second, etc. may be used to describe various components, but the components should not be limited by the terms. The terms may be used only to distinguish one component from another component. For example, a first component may be termed a second component without departing from the scope of the disclosure, and similarly a second component may also be termed a first component.

In the disclosure, the components required for the description of each embodiment of the disclosure are described, but are not limited thereto. Thus, some components may be modified or omitted and other components may be added. In addition, components may be distributed and arranged in different devices independent from each other.

The embodiments of the disclosure will be described in detail with reference to the accompanying drawings and the contents set forth in the accompanying drawings, but the disclosure is not limited or restricted by the embodiments.

The disclosure will now be described in detail with reference to the drawings.

Figure 1:
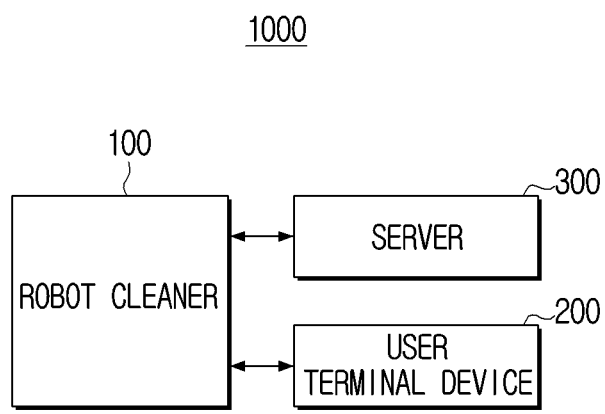
FIG. 1 schematically illustrates an electronic system according to an embodiment of the disclosure.

FIG. 1 schematically illustrates an electronic system according to an embodiment of the disclosure.

Referring to FIG. 1, an electronic system 1000 may include a robot cleaner 100, a user terminal device 200, and a server 300.

The robot cleaner 100 is a device that drives a space and automatically performs a cleaning operation.

Here, the cleaning operation may mean sucking foreign substances such as dirt, dust, etc. present on the floor surface by the robot cleaner 100. The robot cleaner 100 may include a cleaning device (i.e., a cleaning tool) for sucking foreign substances. The cleaning device may include a brush installed to be rotatable to collect foreign substances, and may generate a suction force through a motor or the like to suck foreign substances from the floor surface. At this time, the sucked foreign substances may be accommodated in a dust bin provided in the robot cleaner 100.

The user terminal device 200 is a device capable of performing various functions such as providing information to a user or receiving a user command, and may be various electronic devices such as a smartphone, a tablet, a wearable device, a PC, etc.

The user terminal device 200 may provide the user with information received from an external device, such as the robot cleaner 100 and the server 300, or transmit a command received from the user to the external device. The user terminal device 200 may provide various UIs.

The user terminal device 200 may download and install an application from a server (not shown) providing an application. In this case, the user may execute the application in the user terminal device 200 and input the user account to log into the server 300 through the inputted user account, and the user terminal device 100 may communicate with the server 300 based on the logged-in user account.

The user terminal device 200 is connected to the server 300 through various communication networks, and may transmit and receive various information to and from the server 300 through an application installed in the user terminal device 200. For example, the user terminal device 200 may transmit a control signal for controlling the robot cleaner 100 through the server 300, or receive information provided from the robot cleaner 100.

The server 300 may refer to an electronic device that collects and processes data of an external device. For example, the server 300 may be implemented as various electronic devices such as a smart phone, a tablet, a wearable device, a PC, etc., which can perform functions of a server together with other functions, as well as an apparatus for performing a server dedicated function such as a cloud server. However, this is merely an example, and the server 300 may be implemented with various types of electronic devices that are not listed herein. The server 300 may be implemented as a single device or a set consisting of a plurality of devices. As an example, the server 300 may be a server that providing SmartThings™ service.

The various operations performed by the robot cleaner 100, the user terminal device 200, and the like disclosed herein may be performed through the server 300.

Figure 2:
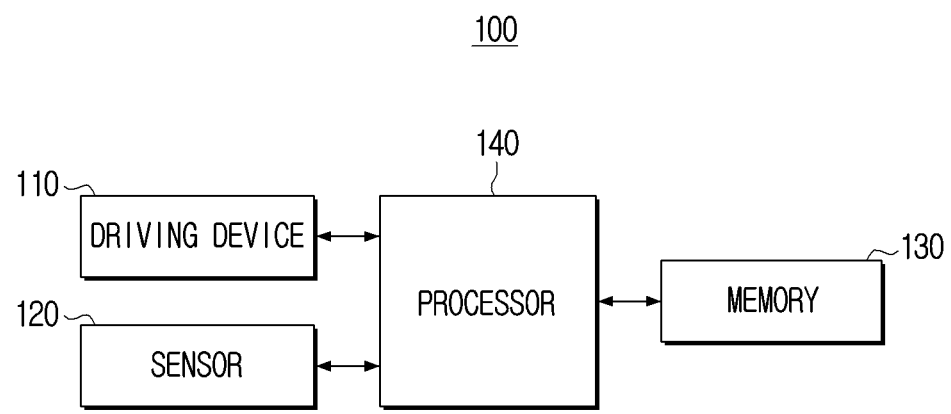
FIG. 2 is a block diagram of a robot cleaner according to an embodiment of the disclosure.

FIG. 2 is a block diagram of a robot cleaner according to an embodiment of the disclosure.

Referring to FIG. 2, the robot cleaner 100 may include a driving device 110, a sensor 120, a memory 130, and a processor 140.

The driving device 110 is configured to move the robot cleaner 100. For example, the driving device 110 may include wheels respectively installed on the left and right sides of the main body of the robot cleaner 100 and motors to drive wheels, or the like. Accordingly, the driving device 110 may perform various driving operations such as movement, stop, speed control, direction change, and angular speed change of the robot cleaner 100.

The sensor 120 is configured to obtain various information related to the robot cleaner 100 and the vicinity of the robot cleaner 100, and may obtain sensing data by sensing the environment of the surrounding space where the robot cleaner 100 is located. For example, the sensor 120 may include at least one of a distance sensor for measuring a distance to an object existing in the surrounding space of the robot cleaner (e.g.: Radio Detection And Ranging (Radar), Light Detection and Ranging (LiDAR), ultrasonic sensor, etc.), a camera (for example, a mono camera, a stereo camera, etc.) for obtaining an image about the surrounding space of the robot cleaner 100, a depth camera, a geomagnetic sensor, a gyro sensor for sensing the angular velocity of the robot cleaner 100, and an encoder for sensing the number of rotations of the wheels installed in the robot cleaner 100, or the like.

The memory 130 is electrically connected to the processor 140 and may store data necessary for various embodiments of the disclosure.

For example, the memory 130 may store a map generated with respect to the space where the robot cleaner 100 is located.

The memory 130 may store instruction or data related to at least one another element of the robot cleaner 100. The memory 130 may be implemented as a non-volatile memory, a volatile memory, a flash memory, a hard disk drive (HDD), a solid state drive (SSD), or the like. The memory 130 is accessed by the processor 140 and reading, writing, modifying, deleting, or updating of data by the processor 140 may be performed. In the disclosure, the term memory may include the memory 130, read-only memory (ROM) in the processor 140, random access memory (RAM), or a memory card (for example, a micro secure digital (SD) card, and a memory stick) mounted to the robot cleaner 100.

The processor 140 may generate (or update) a map for a space in which the robot cleaner 100 is located based on information obtained through the sensor 120. The processor 140 may store the generated (or updated) map in the memory 130.

In this case, the processor 140 may generate a map corresponding to a space in which the robot cleaner 100 is located using a simultaneous localization and mapping (SLAM) algorithm.

For example, the processor 140 may set the position (e.g., coordinates) at which the robot cleaner 100 starts driving and the rotation angle of the robot cleaner 100 as a reference position and a reference rotation angle, respectively, to generate a map. The processor 140 may obtain a position (e.g., a coordinate) and a rotation angle of the robot cleaner 100 (e.g., a rotation angle in which the position of the robot cleaner 100 is reflected) through the SLAM algorithm by using the distance between the robot cleaner 100 and the surrounding object, the rotation angle of the robot cleaner 100, and the moving distance of the robot cleaner 100 during driving of the robot cleaner 100 to generate a map as the input of the SLAM algorithm. In this case, the processor 140 may obtain the distance between the robot cleaner 100 and the surrounding object through the LiDAR sensor. The processor 140 may calculate the rotation angle of the robot cleaner 100 based on the angular velocity of the robot cleaner 100 obtained through the gyro sensor, and calculate the moving distance of the robot cleaner 100 based on the number of rotations of the wheels obtained through the encoder.

The processor 140 may identify the location (e.g., coordinates) of the obstacle from the reference position to the obtained location based on the distance from the reference position to the location obtained through the LiDAR sensor while the robot cleaner 100 moves from the reference position to the obtained location.

As a result, the processor 140 may repeatedly perform the above-described process while the robot cleaner 100 moves the space, thereby generating a map corresponding to the space in which the robot cleaner 100 is located. However, the processor 140 may generate a map using various methods known in the art.

The processor 140 may divide the map into a plurality of regions. For example, the processor 140 may generate a Voronoi graph for the map and divide the map into a plurality of regions using the Voronoi graph.

Here, the Voronoi graph is one of a method of decomposing and displaying a given metric space. Specifically, each line of the Voronoi graph is a line representing the boundaries of these sets when the objects are composed of a set of points not greater than the distance from the specific object to another object, within the metric space where the objects are arranged. That is, the Voronoi graph may be referred to as a line connecting intermediate points at the same distance for two objects in a given metric space.

In this case, the processor 140 may generate a normal line for the Voronoi graph generated based on the map, and classify the map into a plurality of regions in consideration of the area of the closed space and the length of the normal line divided in the map based on the normal line. For example, if the area of the closed space divided in the map is larger than a predetermined size based on a normal line within a predetermined range, the processor 140 may identify a corresponding closed space as one area and identify a gate connecting the identified area and the other area. However, the processor 140 may divide the map into a plurality of regions using various methods known in the art.

The processor 140 may divide the cleaning area where the cleaning operation is performed by the robot cleaner 100 on the map into units of room, and generate a room name for each area divided into the room unit. The detailed description will be described later with reference to FIGS. 6 to 12.

The processor 140 may control the driving device 110 to drive the cleaning area included in the map based on the information obtained through the sensor 120.

In detail, the processor 140 may obtain the position and rotation angle of the robot cleaner 100 on the map through the SLAM algorithm, by using the distance between the robot cleaner 100 and the surrounding object, the rotation angle and the moving distance of the robot cleaner 100, as the input of the SLAM algorithm. The processor 140 may control the driving device 110 to drive the cleaning area of the map based on the obtained position and rotation angle of the robot cleaner 100. The processor 140 may detect an obstacle around the robot cleaner 100 based on a map, a position and a rotation angle of the robot cleaner 100 on the map, and a distance from a surrounding object to the robot cleaner 100 obtained through the LiDAR sensor.

The processor 140 may recognize the surrounding object by using the image obtained through the camera. For example, the processor 140 may recognize the object from the image obtained through the camera and obtain information such as the type and location of the object existing around the robot cleaner 100.

The processor 140 may map and store information on the recognized object at a position corresponding to the position of the object recognized on the map.

The processor 140 may generate a room name based on the information of the object located in each area divided by the units of room on the map. The detailed description will be described later with reference to FIGS. 6 to 12.

Figure 3:
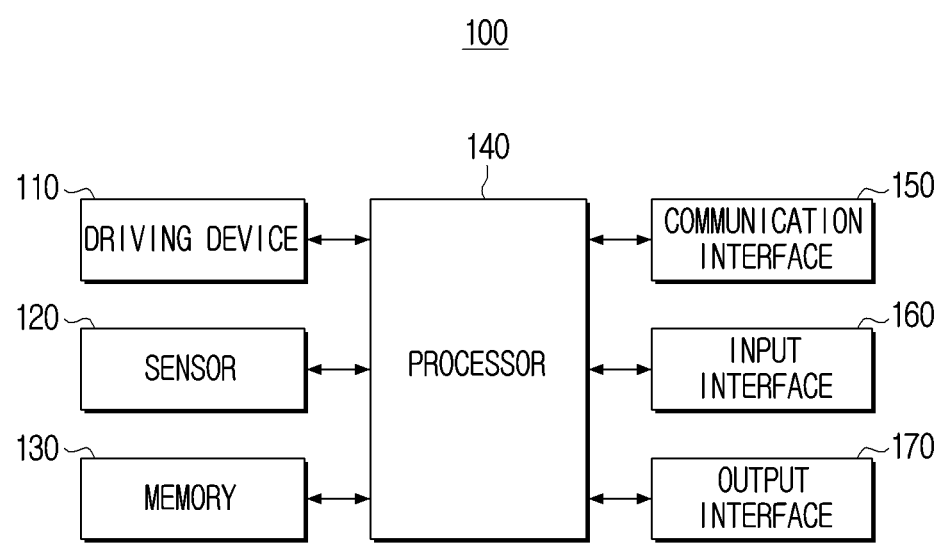
FIG. 3 is a block diagram illustrating a specific configuration of a robot cleaner according to an embodiment of the disclosure.

FIG. 3 is a block diagram illustrating a specific configuration of a robot cleaner according to an embodiment of the disclosure.

Referring to FIG. 3, the robot cleaner 100 may include the driving device 110, a sensor 120, a memory 130, a processor 140, a communication interface 150, an input interface 160, and an output interface 170. The configuration of FIG. 3 which overlaps with FIG. 2 will not be described in detail.

The communication interface 150 may communicate with an external device to transmit and receive various data. For example, the robot cleaner 100 may transmit and receive information to and from the user terminal device 200 and the server 300 through the communication interface 150.

The communication interface 150 may communicate with an external device through a local area network (LAN), an Internet network, and a mobile communication network, but may communicate with an external device through various communication methods such as Bluetooth (BT), Bluetooth Low Energy (BLE), Ultra-Wideband (UWB), Wireless Fidelity (Wi-Fi), Wireless Fidelity Direct (WI-FI Direct), Zigbee, near field communication (NFC), and the like. The communication interface 150 may include various communication modules for performing network communication. For example, the communication interface 150 may include a Bluetooth chip, a Wi-Fi chip, a wireless communication chip, and the like.

The input interface 160 may receive various user commands. For example, the input interface 160 may receive a user command for controlling the robot cleaner 100. The input interface 160 may include a physical button for receiving a user command, or may include a microphone receiving a user utterance voice, and may include a display receiving a user command through the touch screen.

The output interface 170 may include at least one of a display or a speaker. The display is a device that visually (e.g., character, image, etc.) outputs information. The display may display an image frame in all or a portion of the display area. The display area may refer to all of the pixel unit area in which information or data is visually displayed. A speaker is a device to output information in an audible form (e.g., voice). The speaker may directly output various notification sound or voice messages as well as various audio data for which various processing has been performed, such as decoding or amplification, noise filtering, etc., by an audio processor as voice.

Figure 4:
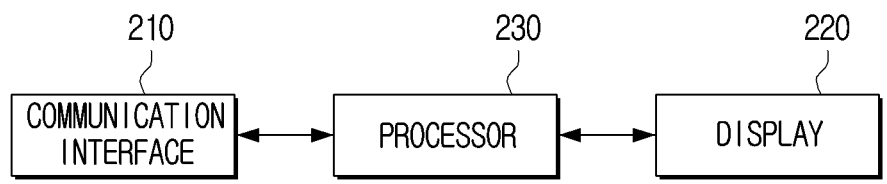
FIG. 4 is a block diagram illustrating a configuration of a user terminal according to an embodiment of the disclosure.

FIG. 4 is a block diagram illustrating a configuration of a user terminal according to an embodiment of the disclosure.

Referring to FIG. 4, the user terminal device 200 may include a communication interface 210, a display 220, and a processor 230.

The communication interface 210 may communicate with an external device such as the robot cleaner 100 and the server 300 to transmit and receive various information. The communication interface 210 may transmit a signal for controlling the robot cleaner 100, such as a user command received through the user terminal device 200, and may receive information from the robot cleaner 100. For example, the user terminal device 200 may receive a map generated from the robot cleaner 100 through the communication interface 210.

The display 220 may output the information in a visual format. The display 220 may display various UIs for providing information or receiving a user command.

The display 220 may be implemented as a display including a self-emitting element or a display including a non-self-limiting element and a backlight. For example, the display may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 220, a backlight unit, a driving circuit which may be implemented as an a-si TFT, low temperature poly silicon (LTPS) TFT, organic TFT (OTFT), or the like, may be included as well. The display 220 may be implemented as a touch screen coupled to a touch sensor, a flexible display, a rollable display, a third-dimensional (3D) display, a display in which a plurality of display modules are physically connected, or the like.

The processor 230 is electrically connected to the communication interface 210 and the display 220, and may control the overall operation of the user terminal device 200.

Specifically, when the processor 230 receives the map information from the robot cleaner 100 through the communication interface 210, the processor 230 may control the display 220 to display the map UI divided into the room unit. In this case, the map UI may indicate a room name corresponding to each of the divided rooms.

The processor 230 may display an editing UI for receiving a division command for one room or a merge command for merging a plurality of rooms to one room on the map UI. In this case, the communication interface 210 may be controlled to transmit the division command or the merge command received through the editing UI to the robot cleaner 100. If the updated map information is received from the robot cleaner 100, the UI in which the room name is updated may be displayed. The detailed description will be described later with reference to FIGS. 9 to 12.

Figure 5:
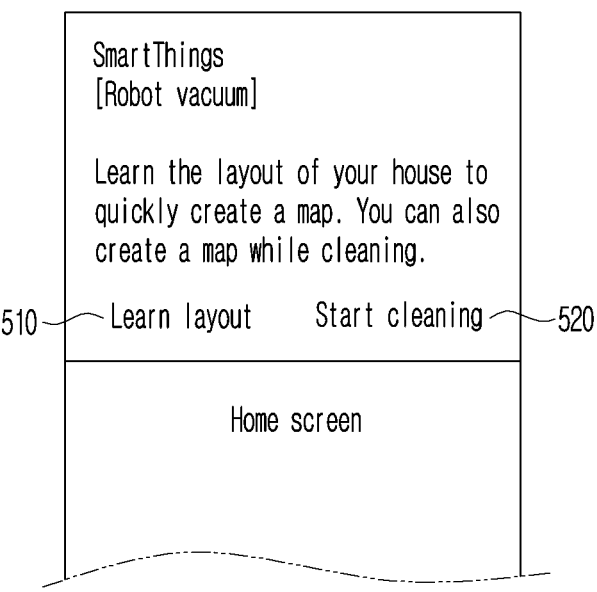
FIG. 5 is a diagram illustrating a user interface (UI) for providing a notification suggesting map making if there is no map stored therein.

FIG. 5 is a diagram illustrating a user interface (UI) for providing a notification suggesting map making if there is no map stored therein.

The UI of FIG. 5 may be provided through the display 220 of the user terminal device 200.

The robot cleaner 100 may provide a notification that suggests map making if there is no map stored in the memory 130. Referring to FIG. 5, the notification may be displayed as a UI displayed through the display 220 of the user terminal device 200.

The notification UI may include a UI 510 for receiving a first user command instructing to perform space learning alone, and a UI 520 for receiving a second user command instructing to perform space learning at the same time as cleaning. The user terminal device 200 may provide the received user command to the robot cleaner 100.

The robot cleaner 100 may move a space and generate a map when a first user command is input. In this case, the robot cleaner 100 may move to a central position of each room to generate a map based on information sensed through the sensor 120.

When the second user command is input, the robot cleaner 100 may perform a cleaning operation and simultaneously generate a map. In this case, the robot cleaner 100 may perform a cleaning operation while moving entire rooms, and at the same time, generate a map based on information sensed through the sensor 120.

The robot cleaner 100 may store the generated map in the memory 130, perform a cleaning operation even after the map is stored, or may update the map if information about a new space, changes in the size of the space, the type of objects disposed in the space or position are sensed.

Figure 6:
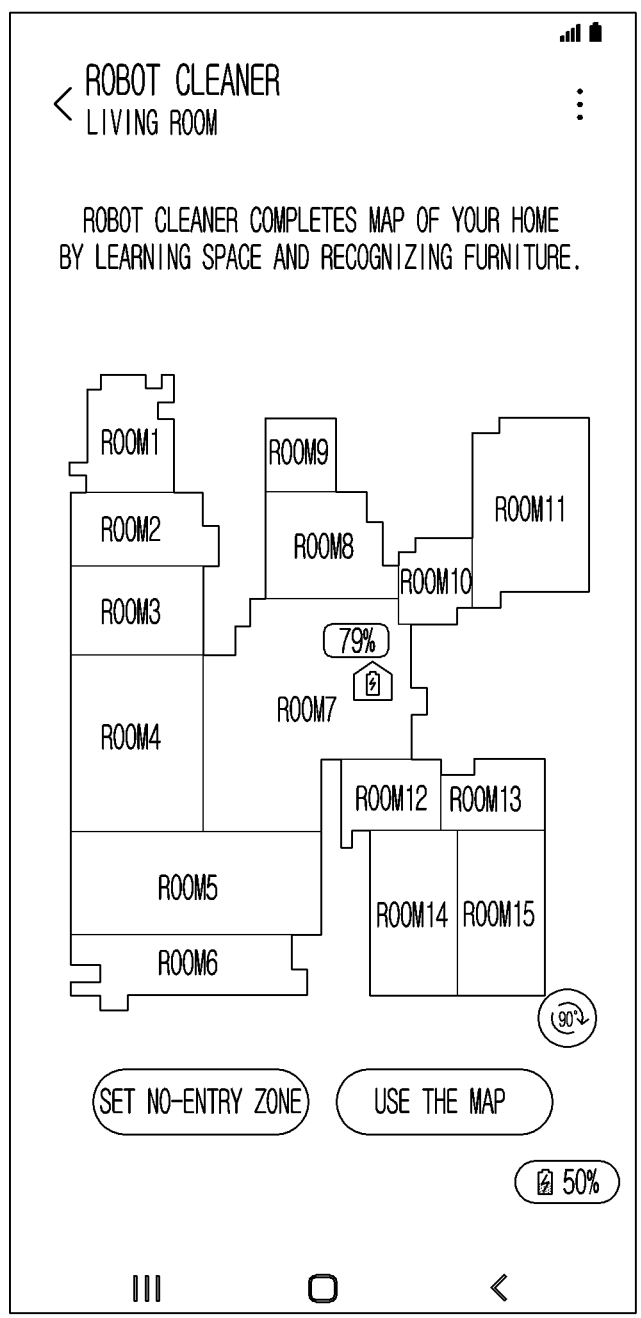
FIG. 6 is a diagram illustrating a map UI provided through a user terminal device according to an embodiment of the disclosure.
Figure 7:
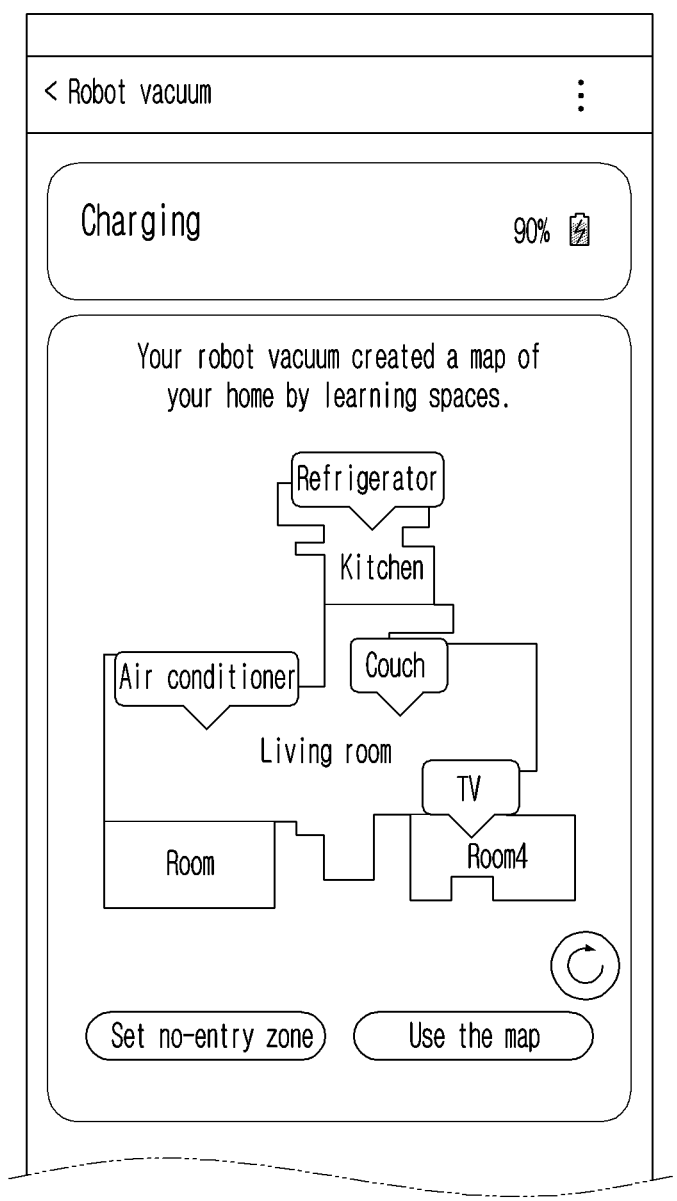
FIG. 7 is a diagram illustrating an operation of dividing a cleaning area on a map UI into units of room and displaying a room name for each room on the map UI.

FIG. 6 is a diagram illustrating a map UI provided through a user terminal device according to an embodiment of the disclosure, and FIG. 7 is a diagram illustrating an operation of dividing a cleaning area on a map UI into room units and displaying a room name for each room on the map UI.

When the user terminal apparatus 200 receives map information from the robot cleaner 100, the user terminal apparatus 200 may display a map UI divided by room units through the display.

Referring to FIG. 6, the map UI may display a room name corresponding to each divided room. The user may instruct the map UI to set a no-entry zone or to store the created map.

Referring to FIG. 7, the map UI may display a designated room name for each area divided into room units.

According to one embodiment, the room name may be generated based on the information of the object located in each room. The robot cleaner 100 may recognize the object located in the space through the sensor 120 and store information about the recognized object on the map. In this case, the robot cleaner 100 may map and store the position of the object on the map so as to correspond to the position of the recognized object.

The robot cleaner 100 may generate a room name based on the information of the object located in each area divided into the room unit.

Figure 8:
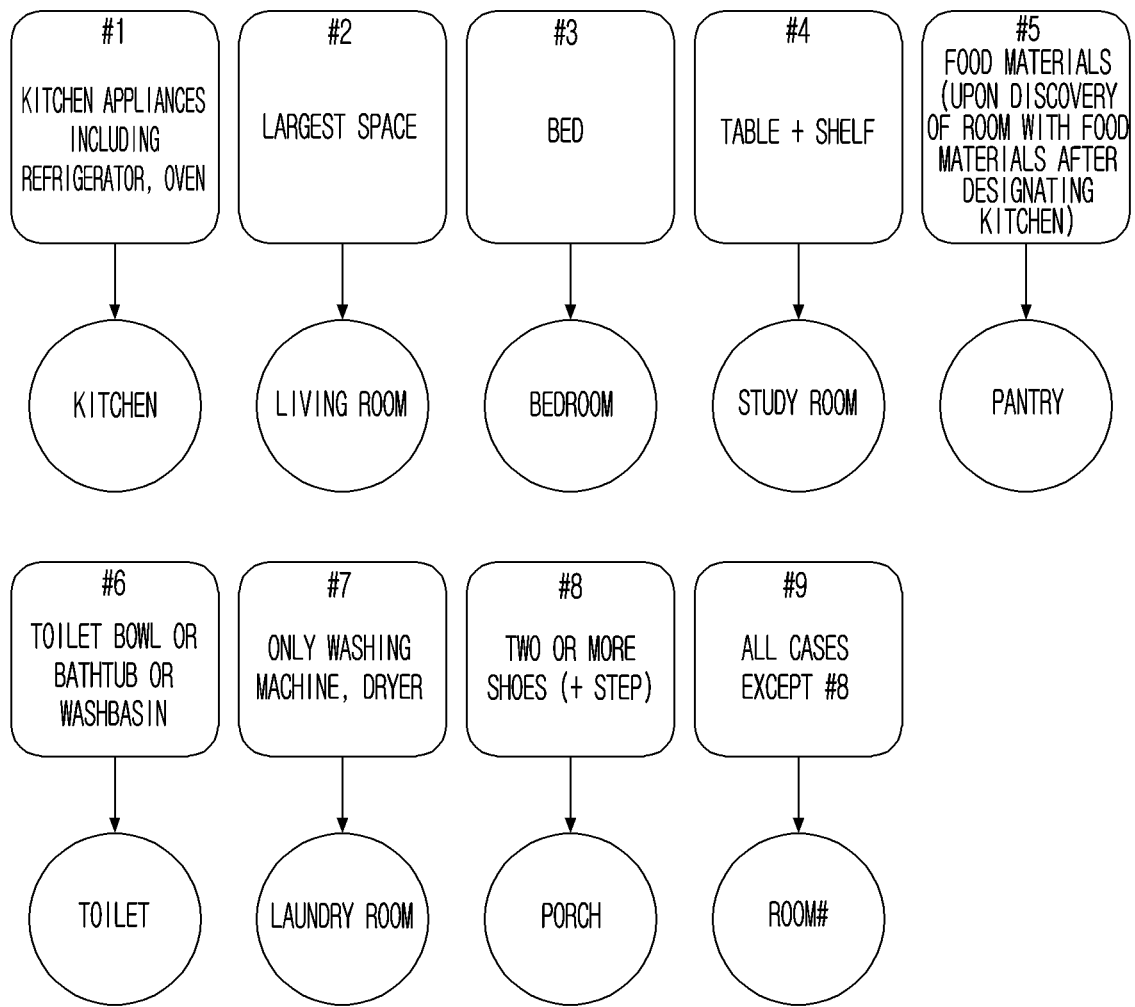
FIG. 8 is a diagram illustrating an operation of generating a room name based on information of an object located in each area divided in units of room on a map UI.

FIG. 8 is a diagram illustrating an operation of generating a room name based on information of an object located in each area divided in a room unit on a map UI.

The robot cleaner 100 may generate a room name based on at least one of the type and the area of the object located in the room. The robot cleaner 100 may perform object recognition through a camera or perform Bluetooth low energy (BLE) communication with various home appliances arranged in a space to obtain a type, a location, and the like of the home appliance. The robot cleaner 100 may obtain an area of each room based on the created map.

FIG. 8 illustrates various embodiments of setting a room name.

For example, a room identified as having kitchen equipment, including a refrigerator, oven, etc., is named "kitchen", a room with the largest room area is named "living room", a room identified as having a bed is named "bedroom", a room identified as having a table and a bookshelf is named "study room", a room identified as having food material is named "pantry", a room identified as having a toilet, bath or sink is named as "toilet", a room identified as having only a washer or dryer is named "laundry room", and an area where two or more shoes are disposed and a step is present is named "porch". In the case of a room in which the predetermined conditions as described above are not identified, the number may be added to the room, such as "room #" to display the name of the room.

The user may edit the area of the room on the map UI. Specifically, a plurality of rooms may be generated by dividing one room according to a user command input, or a plurality of rooms may be merged to generate one room.

The user terminal device 200 may display an editing UI for receiving a division command for one room or a merge command for merging a plurality of rooms into one room on the map UI. The user terminal device 200 may transmit the division command or merge command input through the editing UI to the robot cleaner 100, and when receiving the updated map information from the robot cleaner 100, display the map UI in which the room name is updated.

When a division command for one room is inputted on the map, the robot cleaner 100 may divide the room on the map to correspond to the inputted division command, and generate a room name for each room generated through the division. Also, when a merge command for merging the plurality of rooms into one room is inputted on the map, a plurality of rooms may be merged on the map to correspond to the inputted merge command, and a room name may be generated for one room generated through the merging.

Referring to FIGS. 9 to 12, various embodiments of the editing UI for receiving a division command or a merge command will be described below.

Figure 9:
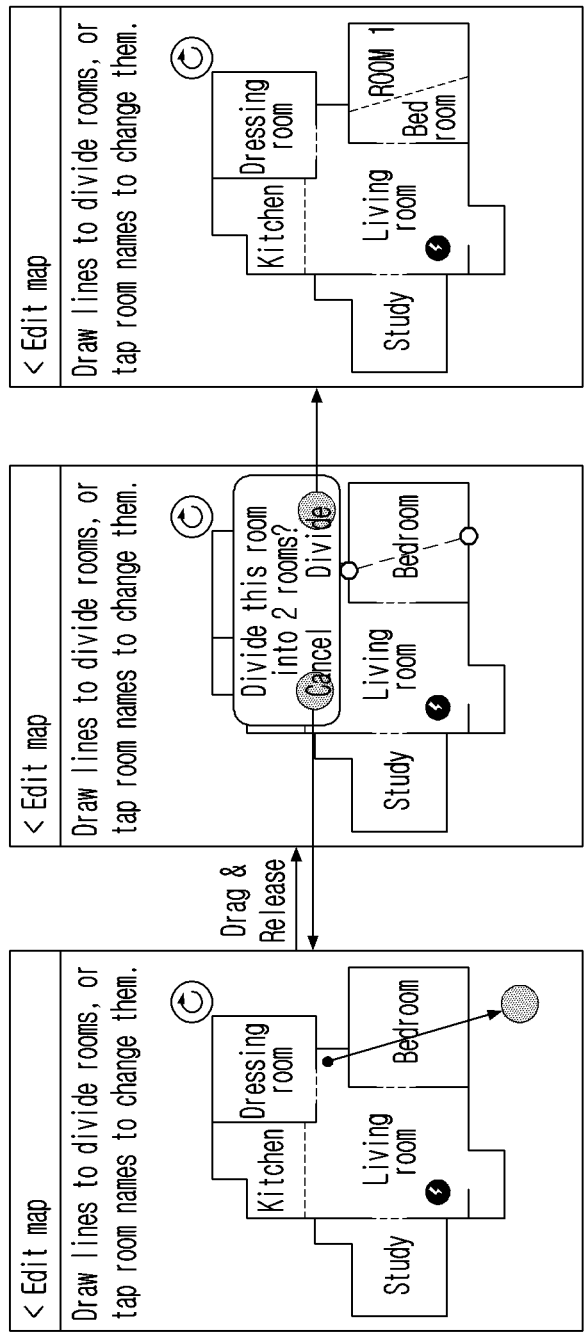
FIG. 9 is a diagram illustrating an operation of dividing a room by generating a division line on a map UI.
Figure 10:
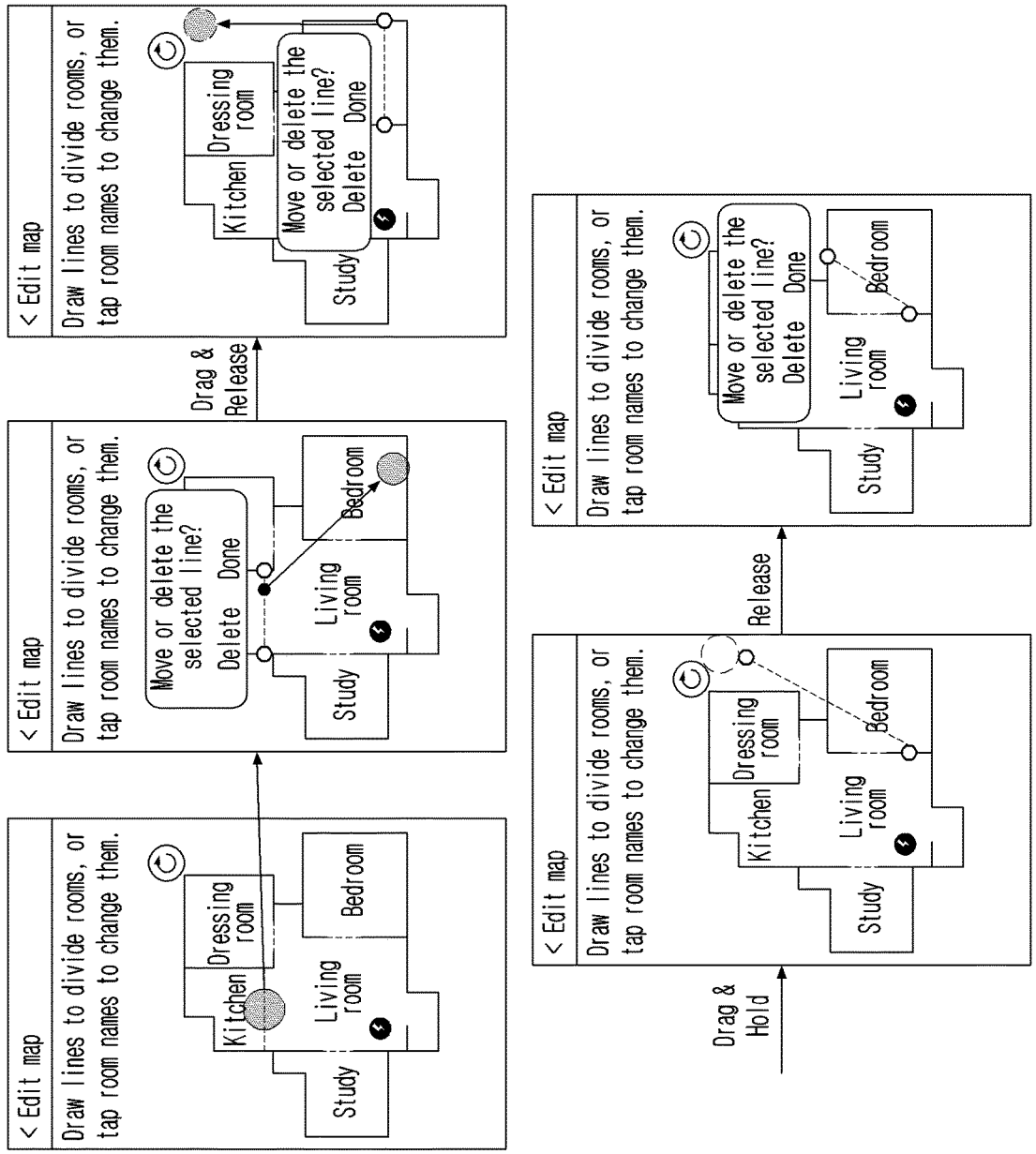
FIG. 10 is a diagram illustrating an operation of dividing a room by modifying a division line on a map UI.

FIG. 9 is a diagram illustrating an operation of dividing a room by generating a division line on a map UI, and FIG. 10 is a diagram illustrating an operation of dividing a room by modifying a division line on a map UI.

Referring to FIG. 9, a user may generate a division line through a touch/drag operation on a map displayed on an editing UI. The editing UI may display a notification window for receiving whether to apply the generated division line, and may divide the room on the map based on the generated division line when the application command is input.

In accordance with an embodiment, name of two rooms created through division may be set based on the information of the object located in each room. For example, the room name may be set by applying the room name setting method described in FIG. 8, on the basis of the information of the object located in each divided region.

In accordance with another embodiment, based on the area of each room generated through the division, the room with the widest area may be designated with the name of the room before division and generate the room name based on the information of the object located in the room for the remaining room.

According to another embodiment, when a recognized object is located in the divided room 1, and there is no recognized object in the divided room 2, the divided room 1 may set a room name based on the information of the object located in the room 1, and the divided room 2 may designate the name of the room before division.

Referring to FIG. 10, a user may modify a division line displayed on an editing UI to divide the room. The editing UI may display a notification window for receiving whether to modify the selected division line when the previously generated division line is selected, and may divide the room on the map based on the modified division line when a modification command is input.

Figure 11:
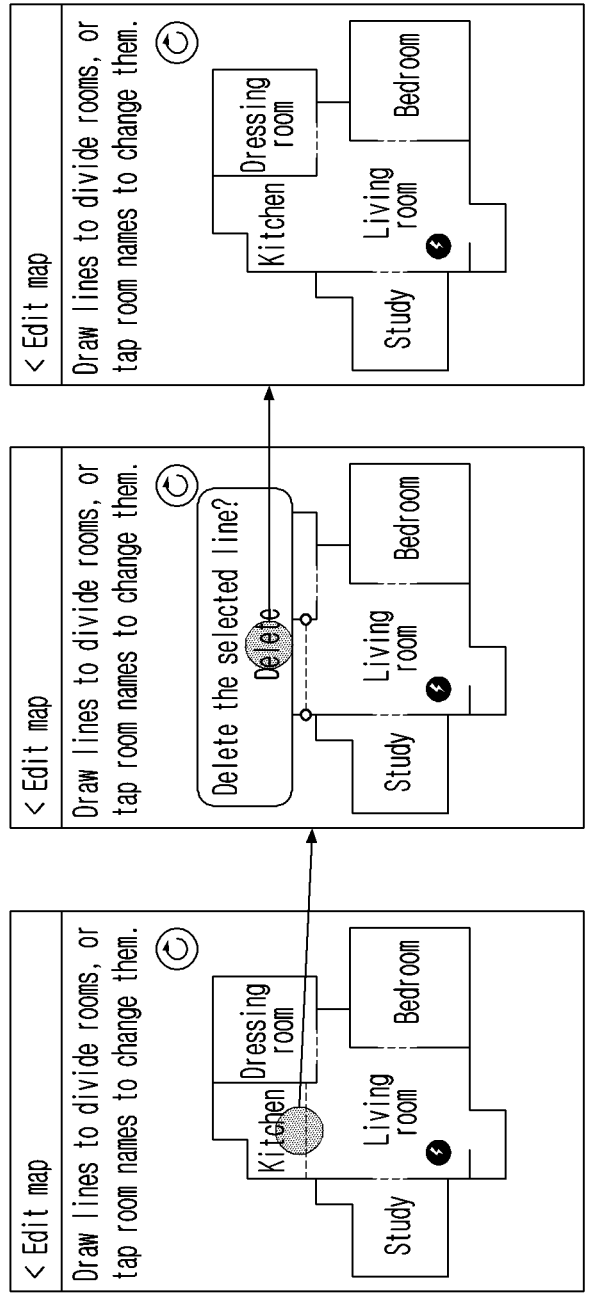
FIG. 11 is a diagram illustrating an operation of deleting a division line on a map UI to merge rooms.
Figure 12:
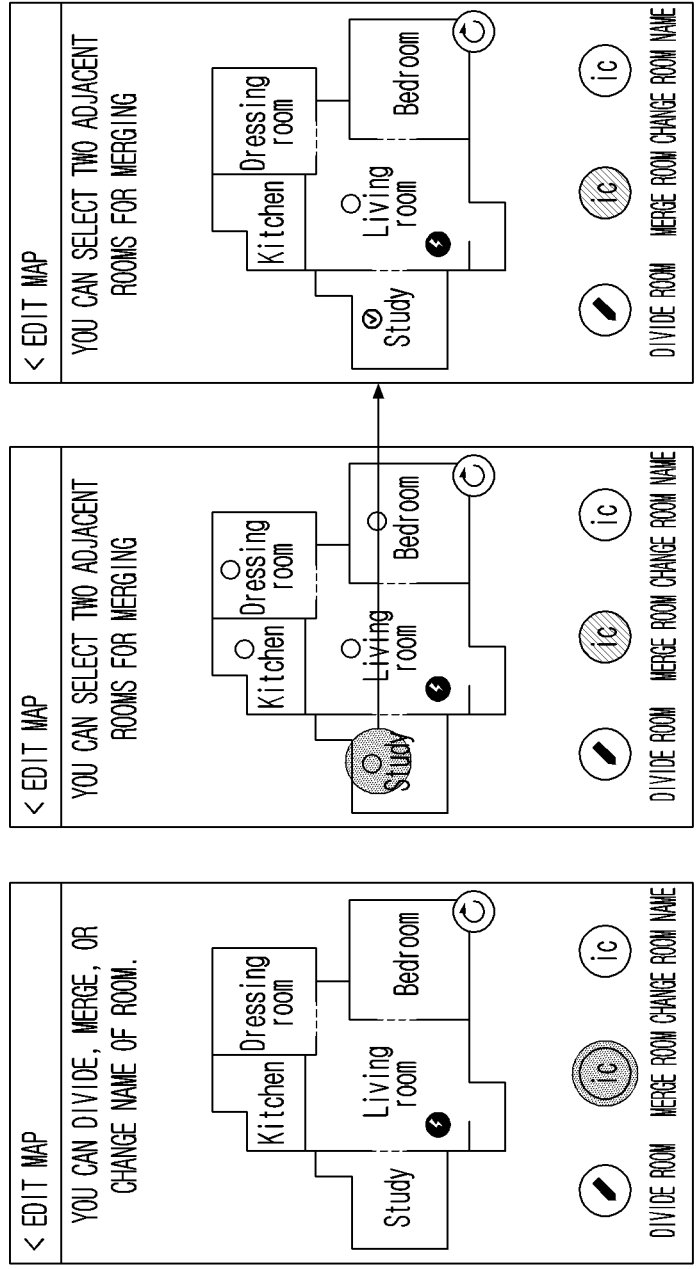
FIG. 12 is a diagram illustrating an operation of selecting a plurality of adjacent rooms on a map UI and merging the rooms.

FIG. 11 is a diagram illustrating an operation of deleting a division line on a map UI to merge rooms, and FIG. 12 is a diagram illustrating an operation of selecting a plurality of adjacent rooms on a map UI and merging the rooms.

Referring to FIG. 11, the user may delete the division line displayed on the editing UI to merge the room. If an existing division line is selected, the editing UI may display a notification window for receiving whether to delete the selected division line, and may merge a plurality of rooms divided on the basis of the deleted division line when a delete command is input.

Referring to FIG. 12, a user may select and merge a plurality of adjacent rooms on an editing UI. For example, when a "room merge" command is input, a UI capable of selecting a room for merging is displayed, and a UI may be controlled to select a room adjacent to the selected room when one room is selected.

According to an embodiment, when a room merging command is inputted, the area of the merged room may be compared to designate the name of the room having a wider area as the name of the merged room.

In accordance with another embodiment, a merged room name may be generated based on the information of the object located in one room generated through the merging. For example, based on the information of the object located in the merged area, a room name may be set by applying the room name setting method described in FIG. 8.

According to another embodiment, when the recognized object is located in the room 1 before merging, and there is no recognized object in room 2, the name of the merged room may be set to be the same as the name of the room 1.

Figure 13:
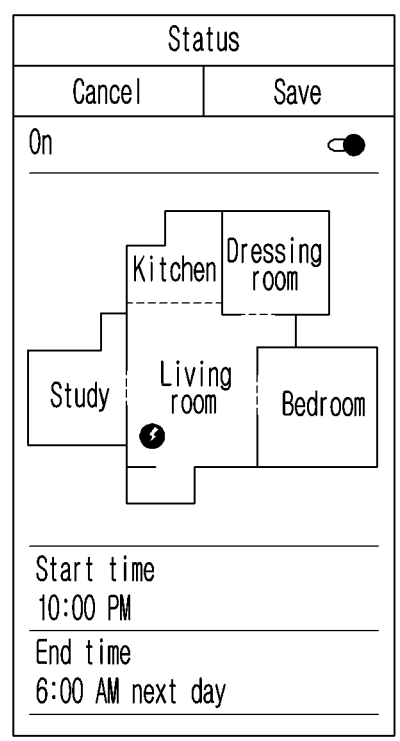
FIG. 13 is a diagram illustrating a UI for setting an operation prohibition time of a robot cleaner according to an embodiment of the disclosure.

FIG. 13 is a diagram illustrating a UI for setting an operation prohibition time of a robot cleaner according to an embodiment of the disclosure.

When the operation prohibition time setting command is input to at least one of the plurality of rooms on the map, the robot cleaner 100 may stop the cleaning operation at a predetermined time zone in the cleaning area corresponding to the room where the operation prohibition time setting command is inputted. In this case, the operation prohibition time may be set for each room. For example, the user may set the studying time zone to the operation prohibition time for the study room, set the time zone mainly watching the TV to the operation prohibition time of the living room, or set the sleeping time zone to the operation prohibition time of the bedroom.

The user terminal device 200 may receive an operation prohibition time setting command through a UI for setting an operation prohibition time and transmit the command to the robot cleaner 100. Referring to FIG. 13, a user may select a room in a map displayed on a UI to set a start time and an end time of an operation prohibition time.

Figure 14:
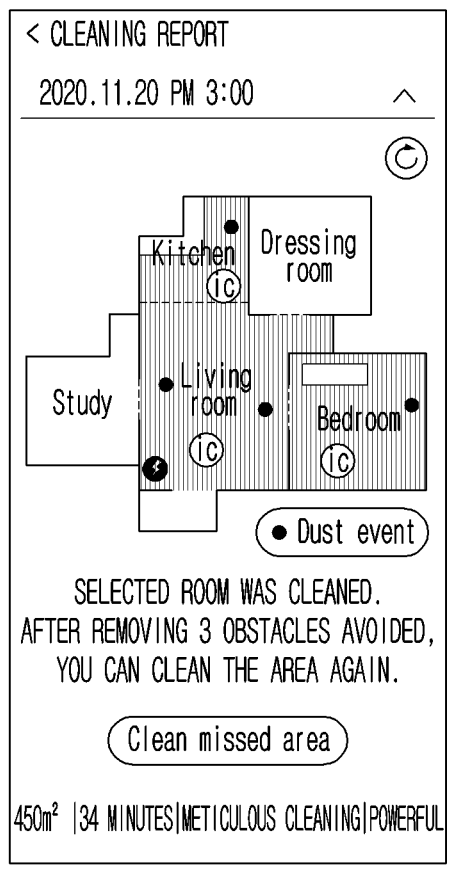
FIG. 14 is a diagram illustrating a UI proposed to clean a clean missed area where cleaning is not completed by an obstacle after performing the cleaning operation of the robot cleaner according to an embodiment of the disclosure.
Figure 15:
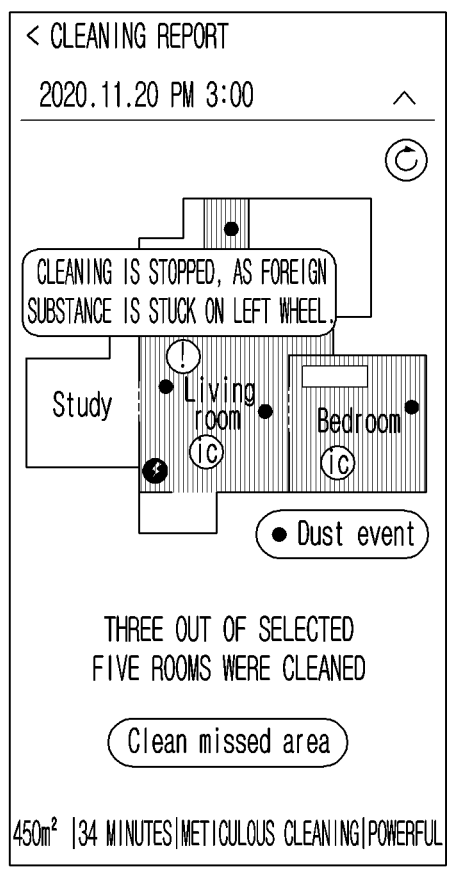
FIG. 15 is a diagram illustrating a UI proposed to clean a clean missed area where cleaning is not completed by the malfunction of the robot cleaner after performing the cleaning operation of the robot cleaner according to an embodiment of the disclosure.

FIG. 14 is a diagram illustrating a UI proposed to clean a clean missed area where cleaning is not completed by an obstacle after performing the cleaning operation of the robot cleaner according to an embodiment of the disclosure, and FIG. 15 is a diagram illustrating a UI proposed to clean a clean missed area where cleaning is not completed by the malfunction of the robot cleaner after performing the cleaning operation of the robot cleaner according to an embodiment of the disclosure.

When the cleaning operation is completed, the robot cleaner 100 may provide a cleaning report for the cleaning result to the user terminal device 200. When a clean missed area where cleaning is not completed due to an obstacle or malfunction of the robot cleaner is present, the user terminal apparatus 200 may provide a UI which controls the user to perform a cleaning operation again with respect to the clean missed area.

In this case, the position of the obstacle is displayed on the map through the UI and information about the obstacle is provided to remove the obstacle to guide to clean the clean missed area. In addition, when a clean missed area is generated due to malfunction of the robot cleaner 100, a position where the malfunction is generated is displayed on the map, and a cause of malfunction is provided.

A clean missed area may occur due to an operation prohibition time set in the robot cleaner 100.

Figure 16:
FIG. 16 is a diagram illustrating a UI proposed to clean a clean missed area where cleaning is not completed by an operation prohibition time set in the robot cleaner after performing the cleaning operation of the robot cleaner according to an embodiment of the disclosure.

FIG. 16 is a diagram illustrating a UI proposed to clean a clean missed area where cleaning is not completed by an operation prohibition time set in the robot cleaner after performing the cleaning operation of the robot cleaner according to an embodiment of the disclosure.

Referring to FIG. 16, when a clean missed area is generated due to an operation prohibition time, the user terminal apparatus 200 may provide a UI for controlling the user terminal apparatus 200 to perform a cleaning operation again after the completion of the operation prohibition time.

Figure 17:
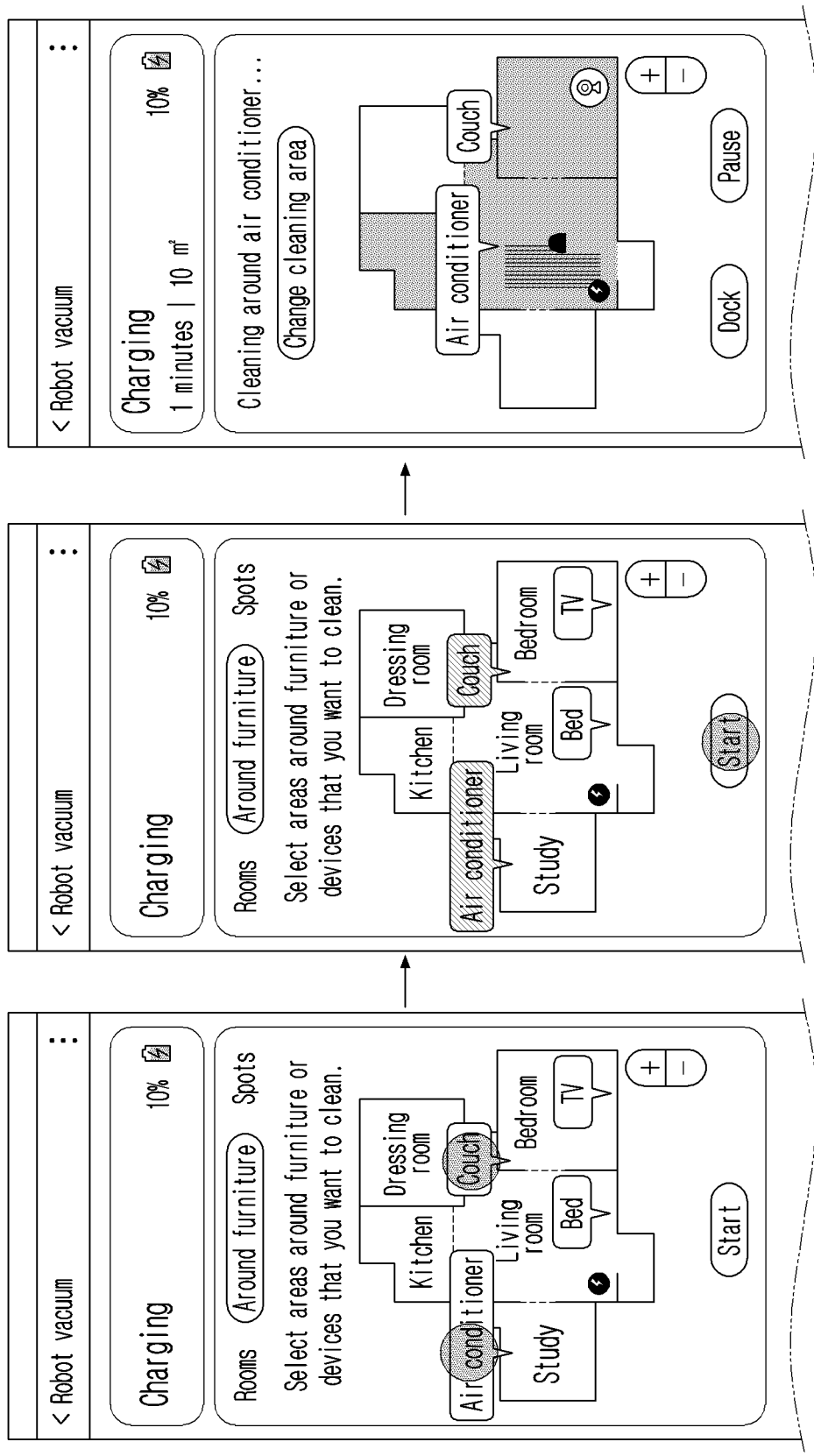
FIG. 17 is a diagram illustrating a UI for controlling a cleaning operation around furniture of a robot cleaner according to an embodiment of the disclosure.

FIG. 17 is a diagram illustrating a UI for controlling a cleaning operation around furniture of a robot cleaner according to an embodiment of the disclosure.

When the cleaning command around the furniture is input, the robot cleaner 100 may perform a cleaning operation for the predetermined area centering on the position of the furniture of the objects stored on the map. The robot cleaner 100 may recognize the position of the furniture in a variety of ways, such as object recognition using an image taken through the camera, position recognition using BLE communication between household appliances. The robot cleaner 100 may recognize the size, shape of the furniture and may determine the cleaning area around the furniture. For example, the robot cleaner 100 may determine the predetermined distance from the furniture to the area around the furniture, and perform a cleaning operation for the area when the cleaning command around furniture is input.

Figure 18:
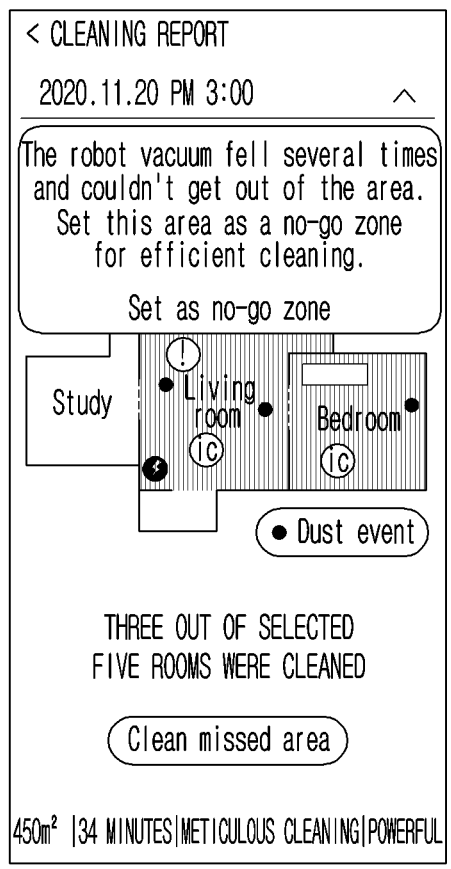
FIG. 18 is a diagram illustrating a UI for guiding a corresponding area to be set to a no-entry zone when a robot cleaner continuously malfunctions in one area on a map according to an embodiment of the disclosure.

FIG. 18 is a diagram illustrating a UI for guiding a corresponding area to be set to a no-entry zone when a robot cleaner continuously malfunctions in one area on a map according to an embodiment of the disclosure.

The robot cleaner 100 may set a cleaning area corresponding to an area in which a malfunction has occurred to a no-entry zone when the robot cleaner 100 is identified to have a malfunction at a predetermined number of times or more in one area on the map. Referring to FIG. 18, when a malfunction occurs over a predetermined number of times in the same area, a UI for guiding the user terminal apparatus 200 to set a no-entry zone may be displayed. In this case, an area where a malfunction occurs on the map may be displayed, and a cause of malfunction may be provided.

Figure 19:
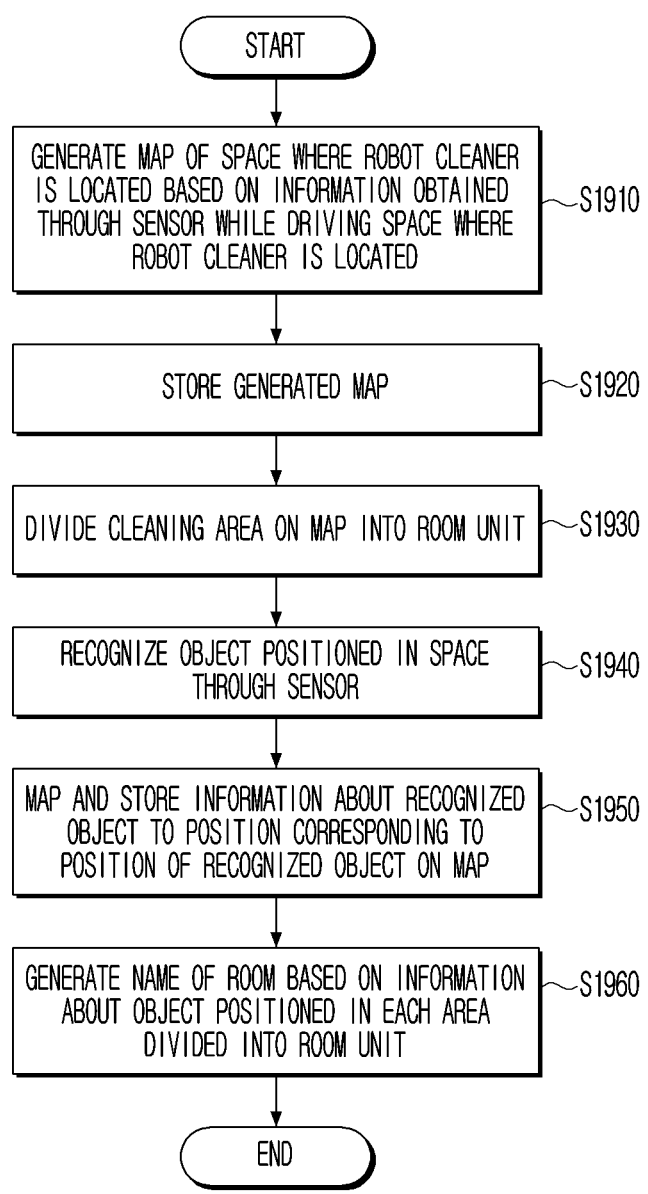
FIG. 19 is a flowchart illustrating a method of controlling a robot cleaner according to an embodiment of the disclosure.

FIG. 19 is a flowchart illustrating a method of controlling a robot cleaner according to an embodiment of the disclosure.

According to an embodiment, a method of controlling a robot cleaner includes generating a map of a space where the robot cleaner is located based on information obtained through a sensor while driving the space where the robot cleaner is located in operation S1910, storing a generated map in operation S1920, dividing a cleaning area on the map into a room unit in operation S1930, recognizing an object positioned in the space through the sensor in operation S1940, mapping and storing information about a recognized object to a position corresponding to the position of the recognized object on the map in operation S1950, and generating a name of a room based on information about an object positioned in each area divided into a room unit in operation S1960.

The robot cleaner may first generate a map for a space in which the robot cleaner is located based on the information obtained through the sensor in operation S1910.

The robot cleaner may store the generated map in operation S1920.

The robot cleaner may divide the cleaning area on the map into room units in operation S1930.

The robot cleaner may recognize an object located within a space through a sensor in operation S1940.

The robot cleaner may map information on the recognized object to a location corresponding to a position of the object recognized on the map and store the mapped information in operation S1950.

The robot cleaner may generate a room name based on the information of the object located in each area divided into the room unit in operation S1960.

In this case, the robot cleaner may generate a room name based on at least one of the type and the area of the object located in the room.

When a division command for one room is inputted on the map, the robot cleaner may divide the room on the map to correspond to the inputted division command, and generate a room name for each room generated through the division. When a merge command for merging the plurality of rooms into one map is inputted on the map, a plurality of rooms may be merged on the map to correspond to the inputted merge command, and a room name may be generated for one room generated through the merging.

When a division command is input, each room name divided based on the information of the object located in each room generated through the division may be generated.

Based on the area of each room generated through the division, the room with the widest area may be designated with the name of the room before division, and the room name may be generated based on the information of the object located in the room for the remaining room.

When a merge command is inputted, the merged room name may be generated based on the information of the object located in one room generated through the merging.

Based on the area of each of the plurality of rooms before merging, the name of the room having the widest area may be generated as the merged room name.

The various embodiments described herein may be practiced separately, as well as in combination with a plurality of embodiments.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium. For example, "non-transitory storage medium" may include a buffer in which data is temporarily stored.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PlayStore™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. A robot cleaner comprising:
   a driving device;
   a sensor;
   a camera;
   a memory; and
   a processor configured to:
      control the driving device to drive the robot cleaner;
      generate a map of a space where the robot cleaner is located based on information obtained through the sensor while driving the robot cleaner in the space;
      store the generated map in the memory;
      generate a normal line for a Voronoi graph generated based on the map;
      classify the map into a plurality of regions in consideration of an area of a closed space and a length of the normal line divided in the map based on the normal line;
      based on the area of the closed space divided in the map is larger than a predetermined size based on a normal line within a predetermined range, identify a corresponding closed space as one area, and identify a gate connecting the identified area and an other area;
      divide the space on the generated map into a plurality of rooms;
      detect an obstacle around the robot cleaner based on the map, a position and a rotation angle of the robot cleaner on the map, and a distance from a surrounding object to the robot cleaner obtained through the sensor;
      obtain an image through the camera;
      recognize an object and a position of the recognized object in the space on the generated map based on the information obtained through the sensor;
      store information about the recognized object and the position of the recognized object on the map; and
      generate a room name based on at least one of a type of the recognized object located at each of the plurality of rooms,
   wherein the processor further configured to:
      based on a division command to divide one room of the plurality of rooms being input on the map, divide the one room on the map to correspond to the input division command, and generate a room name for each of the divided rooms generated through the division;
      based on a merge command to merge two or more rooms of the plurality of rooms to one merged room being input on the map, merge the two or more rooms of the plurality of rooms on the map to correspond to the input merge command, and generate a room name for the one merged room generated through the merging;
      based on an area of each room generated through division command, designate the name of the room before the division to a room having a widest area, and generate a room name based on information about an object located at a room for remaining rooms;
      based on the merge command to merge two or more rooms of the plurality of rooms to one merged room being input on the map is inputted, identify the room name of a room having a widest area, and generate the identified room name of the room having a widest area as the room name for the one merged room.

2. The robot cleaner of claim 1, wherein the processor is further configured to generate the name of each of the divided rooms based on information about the recognized object located at each room generated through the division.

3. The robot cleaner of claim 1, wherein the processor is further configured to generate the room name for the one merged room based on information about an object located at a room generated through the merging.

4. The robot cleaner of claim 1, wherein the processor is further configured to, based on an operation prohibition time setting command being input for at least one of the plurality of rooms on the map, stop a cleaning operation of the robot cleaner at a set time zone at a cleaning area corresponding to the room to which the operation prohibition time setting command is input.

5. The robot cleaner of claim 1, wherein the processor is further configured to, based on a command to clean around furniture being input, control the driving device to perform a cleaning operation for a preset area around a position of furniture among objects stored on the map.

6. The robot cleaner of claim 1, wherein the processor is further configured to, based on identification that a malfunction occurs to the robot cleaner by a preset number or more in an area on the map, set a cleaning area corresponding to the identified area as a no-entry zone.

7. The robot cleaner of claim 1, wherein the processor is further configured to:
provide a notification to propose map making based on the memory not storing a map, generate a map by moving a space based on a first user input being input, and make a map along with performing a cleaning operation based on a second user command being input.

8. A user terminal device comprising:
a display;
a communication interface to receive map information from a robot cleaner through the communication interface; and
a processor configured to,
based on the received map information, control the display to display a map user interface (UI) in which a cleaning area on a map is divided into a plurality of rooms, the map UI including a room name corresponding to each of the plurality of rooms, and
wherein the robot cleaner generates the room name based on at least one of a type of a recognized object located at each of the plurality of rooms,
and the processor further configured to,
based on a division command to divide one room of the plurality of rooms being input on the map, divide the one room on the map to correspond to the input division command, and generate a room name for each of the divided rooms generated through the division;
based on a merge command to merge two or more rooms of the plurality of rooms to one merged room being input on the map, merge the two or more rooms of the plurality of rooms on the map to correspond to the input merge command, and generate a room name for the one merged room generated through the merging;
based on an area of each room generated through division command, designate the name of the room before the division to a room having a widest area, and generate a room name based on information about an object located at a room for remaining rooms,
based on the merge command to merge two or more rooms of the plurality of rooms to one merged room being input on the map is inputted, identify the room name of a room having a widest area, and generate the identified room name of the room having a widest area as the room name for the one merged room.

9. The user terminal device of claim 8, wherein the processor is further configured to:
display an editing user interface (UI) for receiving a division command to divide one room of the plurality of rooms or a merge command to merge the plurality of rooms into one room on the map UI,
control the communication interface to transmit the division command or the merge command input through the editing UI to the robot cleaner, and
based on the received updated map information from the robot cleaner, display the map UI in which the room name is updated.

10. A method of controlling a robot cleaner, the method comprising:
generating a map of a space where the robot cleaner is located based on information obtained through a sensor of the robot cleaner while driving the robot cleaner in the space;
storing the generated map;
generating a normal line for a Voronoi graph generated based on the map;
classifying the map into a plurality of regions in consideration of an area of a closed space and a length of the normal line divided in the map based on the normal line;
based on the area of the closed space divided in the map is larger than a predetermined size based on a normal line within a predetermined range, identifying a corresponding closed space as one area, identifying a gate connecting the identified area and an other area, and dividing the space on the generated map into a plurality of rooms;
detecting an obstacle around the robot cleaner based on the map, a position and a rotation angle of the robot cleaner on the map, and a distance from a surrounding object to the robot cleaner obtained through the sensor;
obtaining an image through a camera of the robot cleaner;
recognizing an object and a position of the recognized object in the space based on the obtained information through the sensor;
obtaining information such as a type and location of the object existing around the robot cleaner through the camera;
storing information about the recognized object and the position of the recognized object on the map; and
generating a room name based on at least one of a type of the recognized object located at each of the plurality of rooms,
wherein the method further comprises:
based on a division command to divide one room of the plurality of rooms being input on the map, dividing the one room on the map to correspond to the input division command, and generating a room name for each of the divided rooms generated through the dividing;
based on a merge command to merge two or more rooms of the plurality of rooms to one merged room being input on the map, merging the two or more rooms of the plurality of rooms on the map to correspond to the input merge command, and generating a room name for the one merged room generated through the merging;
based on a space of each room generated through division command, designating a name of a room before division to a room having a widest space, and generating a room name based on information about an object located at a room for remaining rooms;
based on the merge command to merge two or more rooms of the plurality of rooms to one merged room being input on the map is inputted, identifying the room name of a room having a widest area, and generating the identified room name of the room having a widest area as the room name for the one merged room.

11. The method of claim 10, wherein the generating of the room name includes generating the name of each of the divided rooms based on information about the recognized object located at each room generated through the dividing.

12. The method of claim 10, wherein the generating of the room name includes generating the room name for the one merged room based on information about an object located at a room generated through the merging.

* * * * *